US011807188B2

(12) United States Patent
Nakagawa

(10) Patent No.: US 11,807,188 B2
(45) Date of Patent: Nov. 7, 2023

(54) METHODS AND SYSTEMS FOR CONTROLLING IMAGE CAPTURE SESSIONS WITH EXTERNAL DEVICES

(71) Applicant: TOYOTA MOTOR ENGINEERING & MANUFACTURING NORTH AMERICA, INC., Plano, TX (US)

(72) Inventor: Masashi Nakagawa, Sunnyvale, CA (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 379 days.

(21) Appl. No.: 17/148,792

(22) Filed: Jan. 14, 2021

(65) Prior Publication Data
US 2022/0219645 A1 Jul. 14, 2022

(51) Int. Cl.
*B60R 25/30* (2013.01)
*G06V 40/16* (2022.01)
*B60Q 1/00* (2006.01)

(52) U.S. Cl.
CPC ......... *B60R 25/305* (2013.01); *B60Q 1/0023* (2013.01); *G06V 40/161* (2022.01)

(58) Field of Classification Search
CPC .. B60R 25/305; B60Q 1/0023; G06V 40/161; G08B 13/19647; H04N 7/181
See application file for complete search history.

(56) References Cited

U.S. PATENT DOCUMENTS

| 7,081,813 | B2 | 7/2006 | Winick et al. |
| 8,698,895 | B2 | 4/2014 | Nerayoff et al. |
| 9,365,187 | B2 | 6/2016 | Poder |
| 9,452,732 | B1 | 9/2016 | Hermann et al. |
| 2003/0095688 | A1* | 5/2003 | Kirmuss .......... G08B 13/19695 348/E7.086 |
| 2007/0250232 | A1* | 10/2007 | Dourney ................ G06Q 99/00 340/937 |

(Continued)

FOREIGN PATENT DOCUMENTS

| CN | 110864690 A | 3/2020 |
| JP | 5306660 B2 | 7/2013 |

OTHER PUBLICATIONS

International Search Report and Written Opinion dated Apr. 22, 2022; 12 pages.

*Primary Examiner* — Md K Talukder
(74) *Attorney, Agent, or Firm* — Dinsmore & Shohl LLP

(57) ABSTRACT

Vehicles and a method for initiating, maintaining, and terminating an image capture session with an external image capture component. The method includes initiating an image capture session with an image capture component that is external to the vehicle, receiving, from the image capture component, an image, determining whether image data of the image includes identifying information associated with the vehicle, and instructing the image capture component to maintain the image capture session associated with the vehicle in response to determining that the image data includes identifying information associated with the vehicle. Additionally, the method includes terminating the image capture session with the image capture component in response to determining that the image data does not include the identifying information.

18 Claims, 7 Drawing Sheets

(56) References Cited

U.S. PATENT DOCUMENTS

Figure 1:
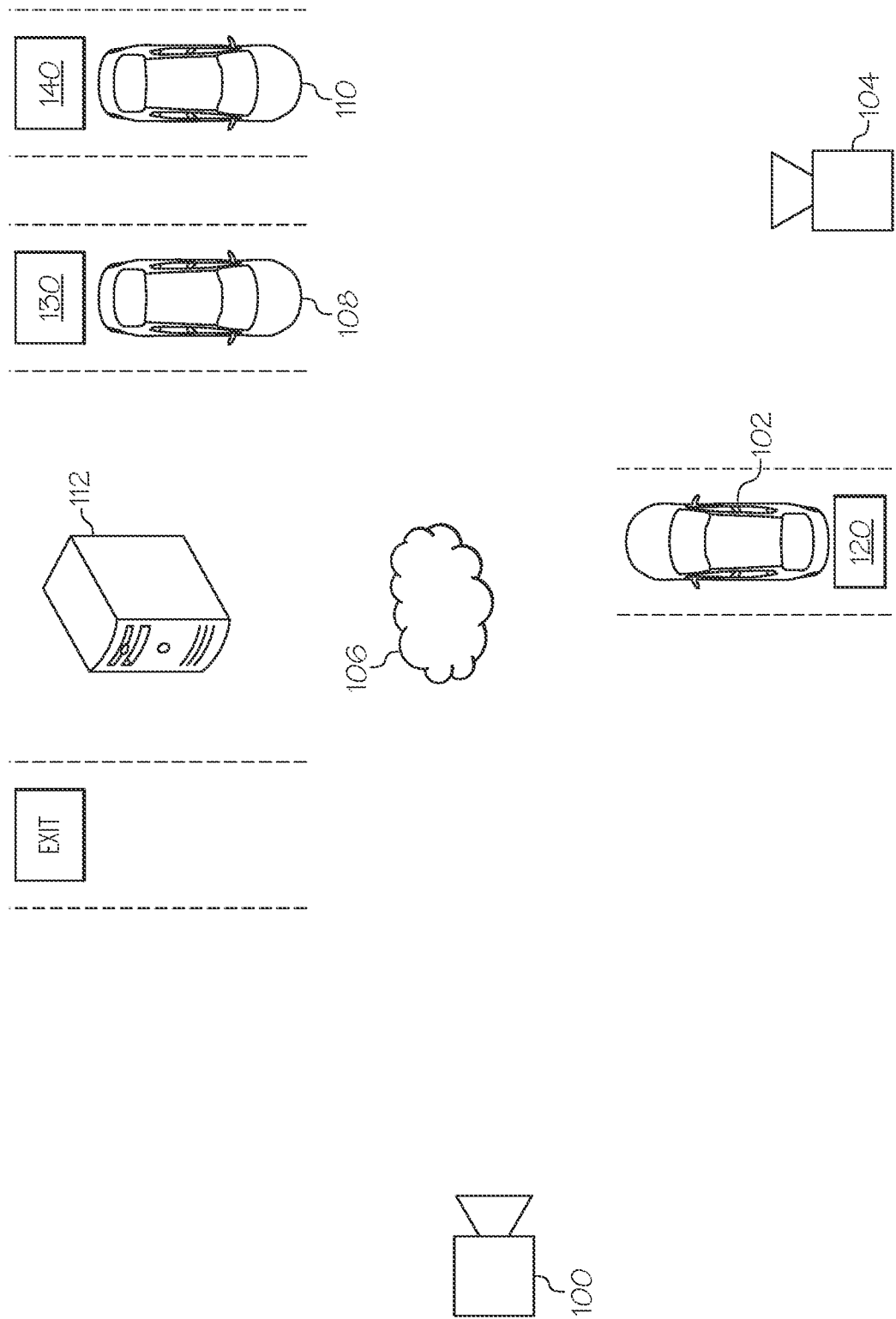

| | | | |
|---|---|---|---|
| 2014/0169634 A1* | 6/2014 | Prakash | G06F 18/22 |
| | | | 382/105 |
| 2015/0022663 A1* | 1/2015 | Wang | G08B 13/19602 |
| | | | 348/148 |
| 2016/0232500 A1* | 8/2016 | Wang | H04N 7/18 |
| 2018/0107891 A1* | 4/2018 | Schmidt | B67D 7/06 |
| 2018/0144622 A1* | 5/2018 | Gage | H04N 1/00103 |
| 2019/0236379 A1* | 8/2019 | Golov | G05D 1/0291 |
| 2020/0151974 A1* | 5/2020 | Ghosh | G07C 5/0866 |
| 2020/0351631 A1* | 11/2020 | Neely | H04W 4/023 |
| 2022/0108115 A1* | 4/2022 | Iyer | G06Q 40/08 |
| 2022/0392340 A1* | 12/2022 | De Steuben | G08G 1/0141 |

* cited by examiner

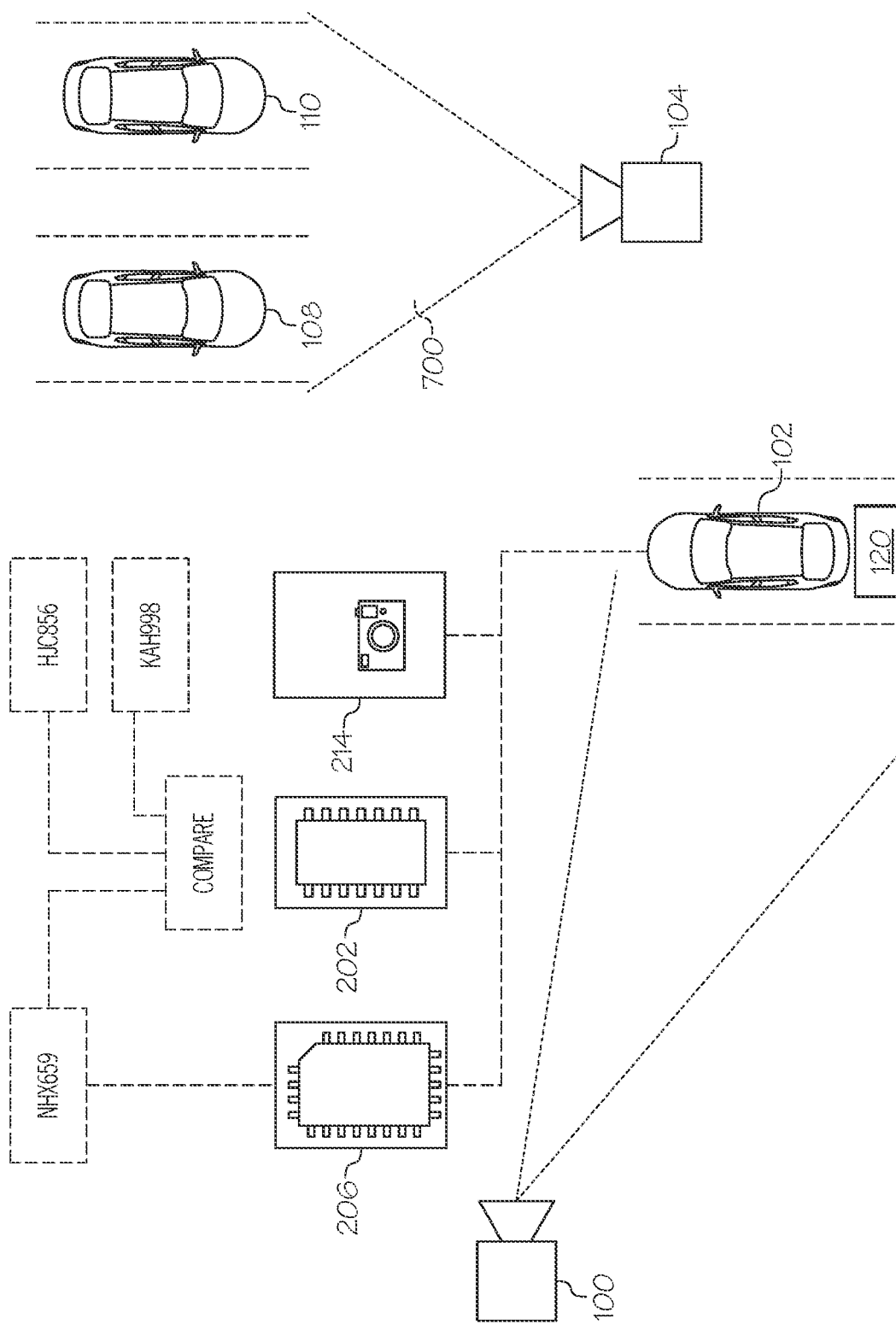

US 11,807,188 B2

METHODS AND SYSTEMS FOR CONTROLLING IMAGE CAPTURE SESSIONS WITH EXTERNAL DEVICES

TECHNICAL FIELD

The present disclosure generally relates to vehicle systems that are configured to initiate, maintain, and terminate image capture sessions, and more specifically, to initiating, maintaining, and terminating image capture sessions with one or more image capture components that are external to these vehicle systems.

BACKGROUND

Conventional vehicles systems may include various vehicle security and surveillance capabilities that prevent individuals from accessing, operating, or tampering with vehicles without authorization. Specifically, conventional vehicle systems may prevent vehicle theft using motion and proximity sensors installed within these vehicles. However, conventional vehicle systems lack the capability to access and leverage the functionalities of external devices to effectively surveil vehicles.

Accordingly, a need exists for vehicles that include vehicle systems that control the functionalities of devices that are external to vehicle systems to monitor the activity in and around these vehicles.

SUMMARY

In one embodiment, a vehicle that is configured to initiate and maintain an image capture session with an image capture component that is external to the vehicle is provided. The vehicle includes a processor that is configured to initiate an image capture session with an image capture component that is external to the vehicle, receive, from the image capture component, an image, determine whether image data of the image includes identifying information associated with the vehicle, and instruct the image capture component to maintain the image capture session associated with the vehicle in response to determining that the image data includes identifying information associated with the vehicle.

In another embodiment, a method of initiating and maintaining an image capture session with an image capture component that is external to a vehicle is provided. The method includes initiating an image capture session with an image capture component that is external to the vehicle, receiving, from the image capture component, an image, determining whether image data of the image includes identifying information associated with the vehicle, and instructing the image capture component to maintain the image capture session associated with the vehicle in response to determining that, the image data includes identifying information associated with the vehicle.

In another embodiment, a vehicle that is configured to initiate and terminate an image capture session with an image capture component that is external to the vehicle is provided. The vehicle includes a processor configured to initiate an image capture session with an image capture component that is external to the vehicle, receive, from the image capture component, an image, analyze the image, and instruct, based on the analyzing of the image, the image capture component to terminate the image capture session with the vehicle.

BRIEF DESCRIPTION THE DRAWINGS

Figure 2:
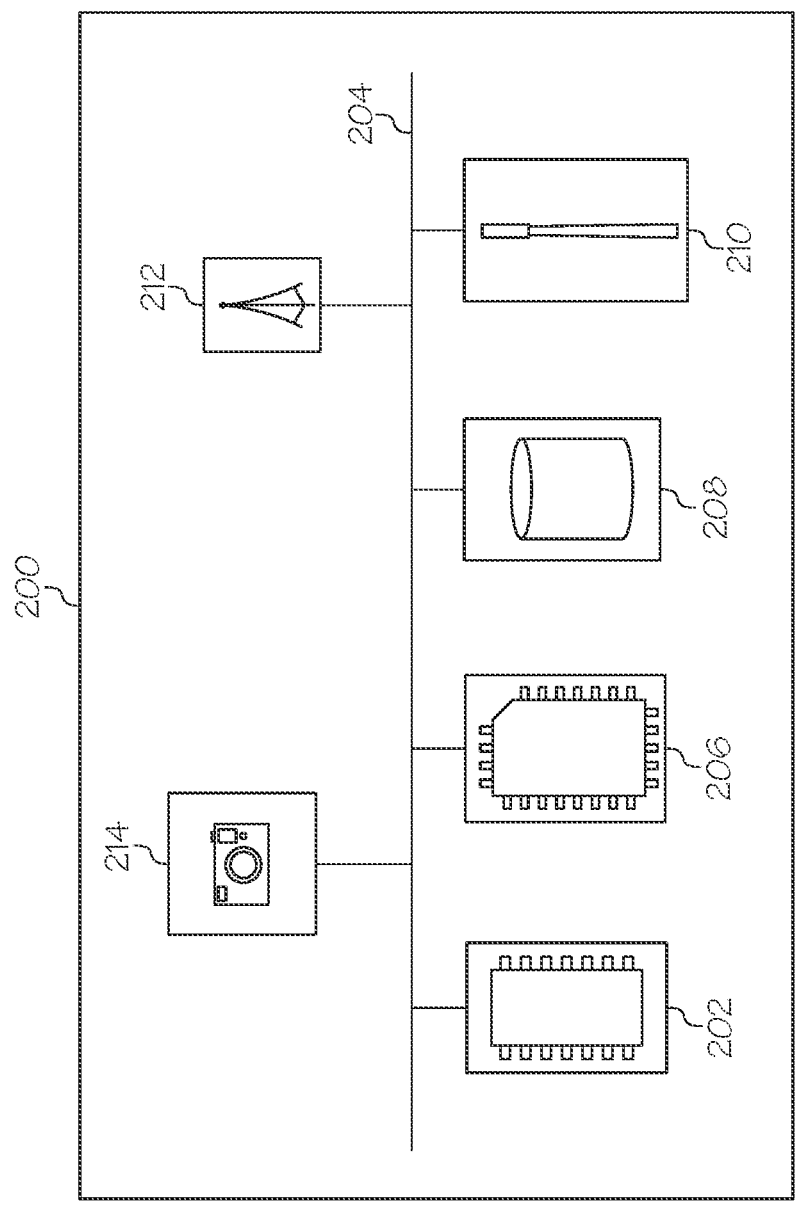
Figure 3:
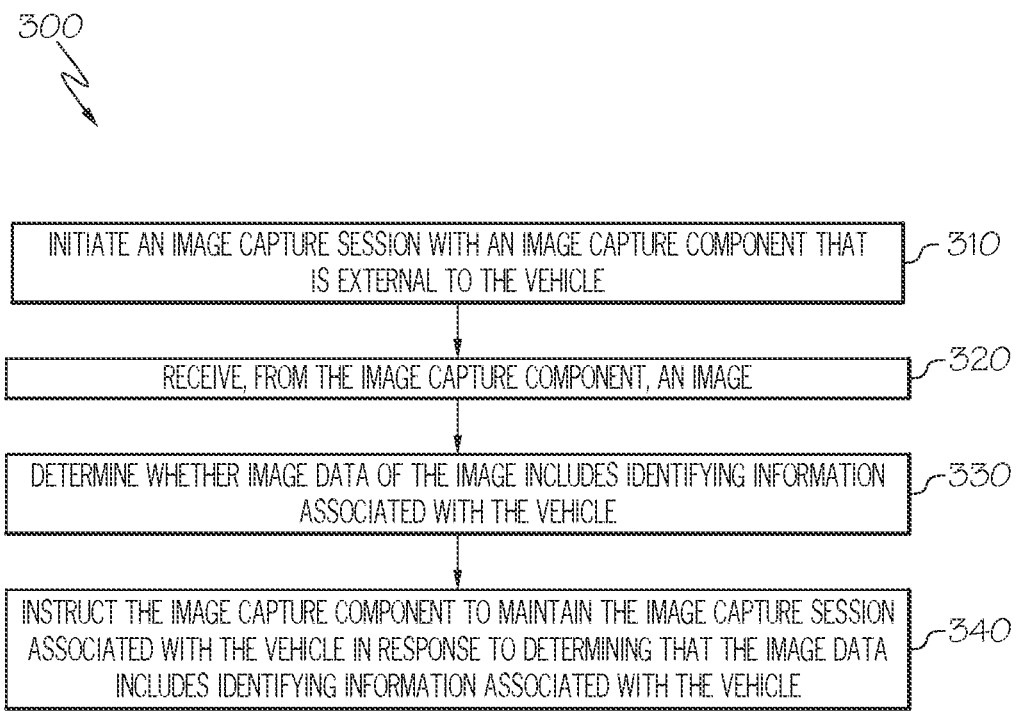
Figure 4:
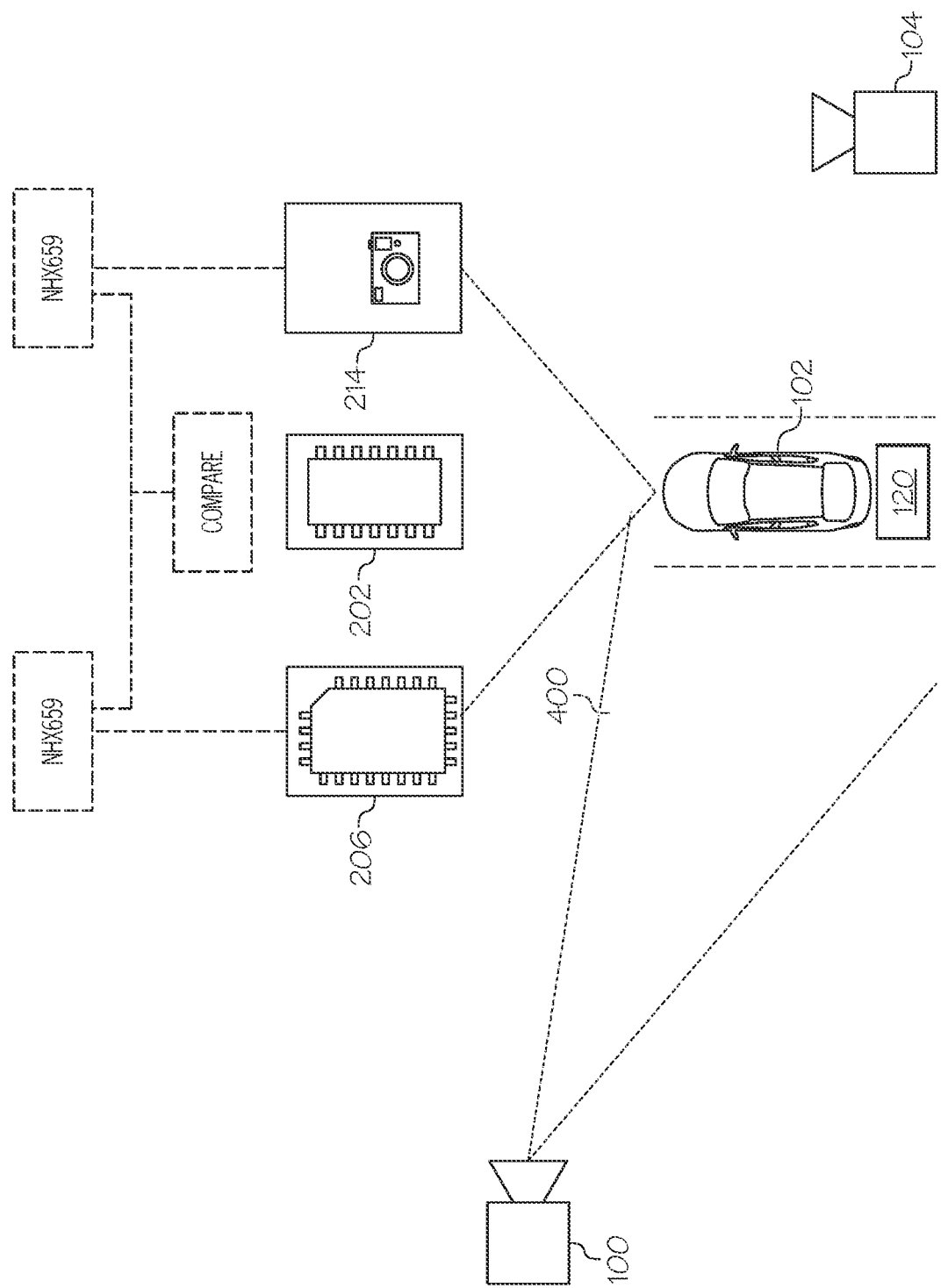
Figure 5:
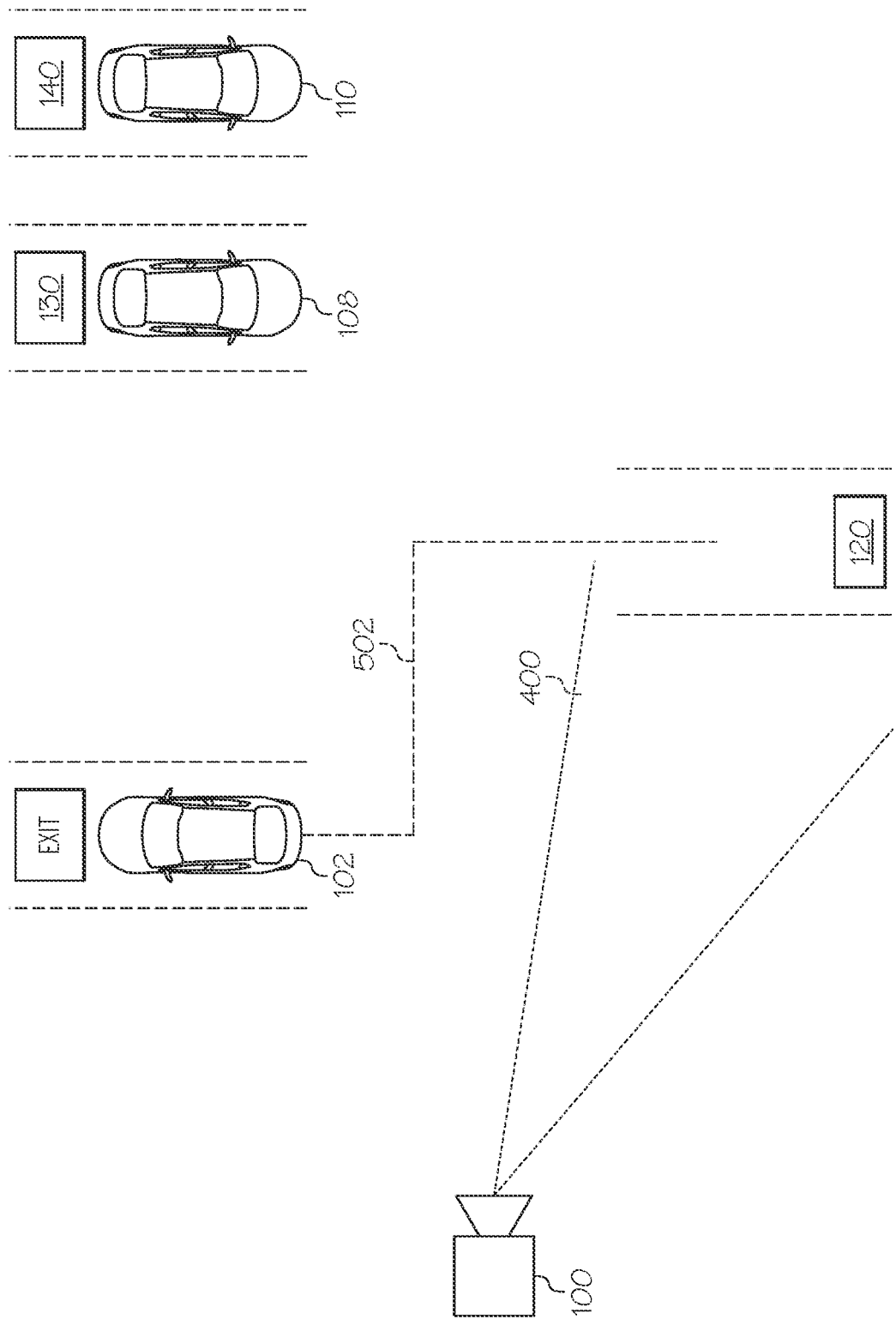
Figure 6:
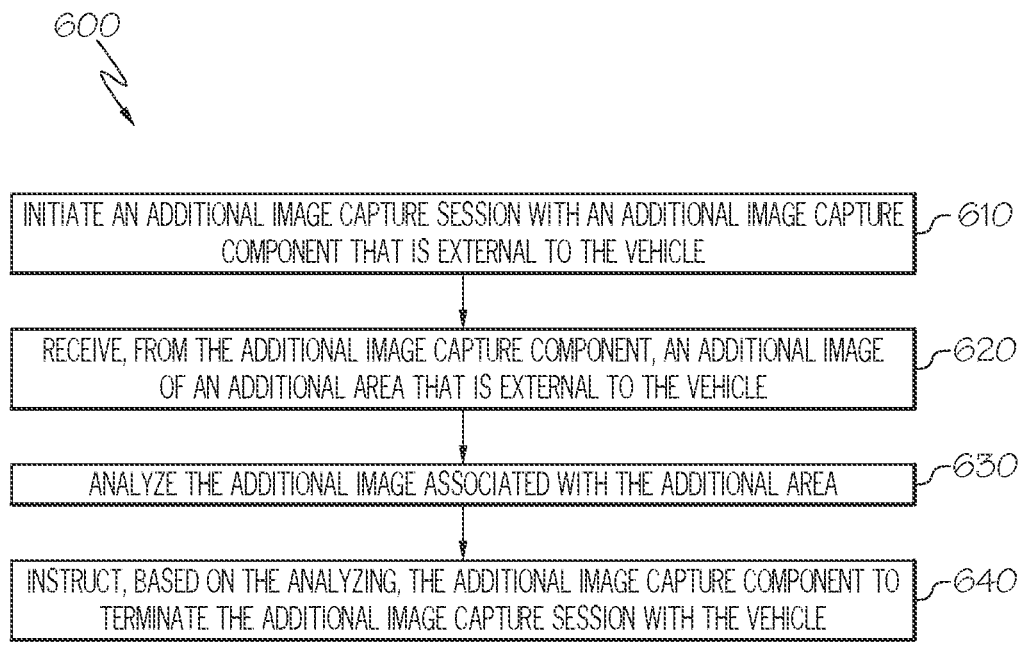

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 1 schematically depicts vehicles that are configured to initiate, maintain, and terminate image capture sessions with image capture components under certain conditions, according to one embodiments described and illustrated herein;

FIG. 2 schematically depicts non-limiting components of a vehicle system, according to one or more embodiments shown herein;

FIG. 3 depicts a flow chart for initiating and maintaining, by a vehicle, an image capture session with an image capture component that is external to the vehicle, according to one or more embodiments described and illustrated herein;

FIG. 4 schematically depicts an example operation of the image capture component in association with the vehicle, according to one or more embodiments described and illustrated herein;

FIG. 5 schematically depicts an example operation of the image capture component relative to the vehicle based on a movement of the vehicle outside the field of view of the image capture component, according to one or more embodiments described and illustrated herein; and FIG. 6 depicts a flow chart for initiating and terminating an image capture session with an image capture component that is external to the vehicle, according to one or more embodiments described and illustrated herein; and FIG. 7 depicts an example operation for initiating and terminating, by the vehicle, an additional image capture session with an additional image capture component that is external to the vehicle, according to one or more embodiments described and illustrated herein.

DETAILED DESCRIPTION

The embodiments disclosed herein describe vehicles and methods for initiating, maintaining, and terminating image capture sessions with one or more image capture components that are external to the vehicles under various circumstances. For example, an embodiment of the vehicle described herein may include a processor that is configured to initiate an image capture session with an image capture component that is external to the vehicle, analyze image data of one or more images received from the image capture component, and control the operation of the image capture component for a certain period of time. In embodiments, if the processor determines, based on the analysis, that the image data includes identifying information associated with the vehicle, the processor may instruct the image capture component to maintain the image capture component. In some embodiments, the processor may, automatically and without user intervention, terminate the initiated image capture session with the image capture component. However, if the processor determines that the image data does not include the identifying information, the processor may terminate the image capture session with the image capture component or instruct the image capture component to terminate the image capture session.

In embodiments, while maintaining an image capture session, the processor of a vehicle may receive multiple images or a live video stream of one or more objects within the line of sight of the image capture component, e.g., at predetermined intervals during the image capture session, throughout the image capture session (e.g., live video stream), and/or the like. In embodiments, the images or the live video stream may relate to areas within a certain proximity of the vehicle. In this way, the vehicle and areas in and around the vehicle may be effectively monitored so that any unauthorized activity associated with the vehicle, e.g., attempts by an unauthorized individual to tamper with or access the vehicle, are identified. In addition, the vehicle receives and processes the images or the live video stream from external image capture components to identify any suspicious activity. Because the vehicle has greater computing resources/power compared to the external image capture components, the vehicle may accurately identify suspicious activities without significant delays.

Referring now to the drawings, FIG. 1 schematically depicts vehicles 102, 108, and 110 that are configured to initiate, maintain, and terminate image capture sessions with image capture components 100, 104 under certain conditions, according to one embodiments described and illustrated herein.

As illustrated, FIG. 1 depicts vehicles 102, 108, and 110, parked at multiple locations (e.g., parking spots 120, 130, 140) within a parking lot with image capture components 100, 104 positioned in areas adjacent to these vehicles. In some embodiments, the image capture components 100, 104 may be cameras that are part of a closed circuit television (CCTV) network and configured to communicate with the vehicles 102, 108, 110, via communication network 106. In some embodiments, the cameras may function independent of each other and be configured to communicate with the vehicles 102, 108, 110.

In some embodiments, the vehicle 102, 108, 110 may initiate image capture sessions with the image capture components 100, 104, via the communication network 106, e.g., using various communication protocols. In some embodiments, as part of the image capture sessions, these vehicles may receive images, a live video stream, etc., of objects within the field of view of the image capture components 100, 104. Each of these vehicles may analyze image data from the received images and/or the live video stream to determine whether these images include identifying information associated with these vehicles. The identifying information may be specific features of the vehicles including, but not limited to, colors, makes, models, shapes, contours, trim data, dimensions, license plate numbers, accessories of the vehicles, and the like.

In some embodiments, if identifying information associated with these vehicles is determined to be present in the image data, these vehicles may maintain the image capture session for a certain period of time. In other words, these vehicles may instruct the image capture components to continue capturing images or a live video stream of these vehicles for a certain period of time. In some embodiments, if the vehicles receive images or a live video stream that displays one or more individuals trying to tamper with or access these vehicles without authorization, a warning may be automatically generated by the vehicle. Such a warning may be generated and transmitted, automatically and without user intervention, to one or more devices associated with the owners of these vehicles. In this way, real time surveillance of the vehicles within a geographic area may be performed to effectively monitor these vehicles and identify possible instances of theft without requiring individuals (e.g., security personnel) to be present near these vehicles.

FIG. 2 schematically depicts non-limiting components of a vehicle system 200, according to one or more embodiments shown herein. Notably, while the vehicle system 200 is depicted in isolation in FIG. 2, the vehicle system 200 may be included within a vehicle. For example, the vehicle system 200 may be included within each of the vehicles 102, 108, 110. In embodiments in which the vehicle system 200 is included within the vehicles 102, 108, 110, these vehicles may be an automobile or any other passenger or non-passenger vehicle such as, for example, a terrestrial, aquatic, and/or airborne vehicle. In some embodiments, these vehicles may be autonomous vehicles that navigate their environments with limited human input or without human input.

The vehicle system 200 includes a processor 202. The processor 202 may be any device capable of executing machine readable and executable instructions. Accordingly, the processor 202 may be a controller, an integrated circuit, a microchip, a computer, or any other computing device. The processor 202 may be coupled to a communication path 204 that provides signal interconnectivity between various modules of the system. Accordingly, the communication path 204 may communicatively couple any number of processors (e.g., comparable to the processor 202) with one another, and allow the modules coupled to the communication path 204 to operate in a distributed computing environment. Specifically, each of the modules may operate as a node that may send and/or receive data. As used herein, the term "communicatively coupled" means that the coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 also includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the processor 202. The machine readable and executable instructions may comprise logic or algorithm(s) written in any programming language of any generation (e.g., 1GL, 3GL, 4GL, or 5GL) such as, for example, machine language that may be directly executed by the processor 202, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. In some embodiments, the one or more memory modules 206 may store data related to status and operating condition information related to one or more vehicle components, e.g., brakes, airbags, cruise control, electric power steering, battery condition, and so forth.

The vehicle system 200 may include one or more sensors 208. Each of the one or more sensors 208 is coupled to the communication path 204 and communicatively coupled to the processor 202. The one or more sensors 208 may include one or more motion sensors for detecting and measuring motion and changes in motion of the vehicle. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

Still referring to FIG. 2, the vehicle system 200 optionally includes a satellite antenna 210 coupled to the communication path 204 such that the communication path 204 communicatively couples the satellite antenna 210 to other modules of the vehicle system 200. The satellite antenna 210 is configured to receive signals from global positioning system satellites. Specifically, in one embodiment, the satellite antenna 210 includes one or more conductive elements that interact with electromagnetic signals transmitted by global positioning system satellites. The received signal is transformed into a data signal indicative of the location (e.g., latitude and longitude) of the satellite antenna 210 or an object positioned near the satellite antenna 210, by the processor 202.

The vehicle system 200 may include a network interface hardware 212 for communicatively coupling the vehicle system 200 with a server 112, e.g., via communication network 106. The network interface hardware 212 is coupled to the communication path 204 such that the communication path 204 communicatively couples the network interface hardware 212 to other modules of the vehicle system 200. The network interface hardware 212 may be any device capable of transmitting and/or receiving data via a wireless network. Accordingly, the network interface hardware 212 may include a communication transceiver for sending and/or receiving data according to any wireless communication standard. For example, the network interface hardware 212 may include a chipset (e.g., antenna, processors, machine readable instructions, etc.) to communicate over wireless computer networks such as, for example, wireless fidelity (Wi-Fi), WiMax, Bluetooth, IrDA, Wireless USB, Z-Wave, ZigBee, or the like. In some embodiments, the network interface hardware 212 includes a Bluetooth transceiver that enables the vehicle system 200 to exchange information with the server 112 via Bluetooth communication.

The network interface hardware 212 may utilize various communication protocols to establish a connection between the vehicle system 200 of a vehicle and one or more image capture components that are external to the vehicle. For example, in embodiments, the network interface hardware 212 may utilize a communication protocol that enables communication between a vehicle and various other devices, e.g., vehicle-to-everything (V2X). Additionally, in other embodiments, the network interface hardware 212 may utilize a communication protocol that is dedicated for short range communications (DSRC). Compatibility with other comparable communication protocols are also contemplated.

It is noted that communication protocols include multiple layers as defined by the Open Systems Interconnection Model (OSI model), which defines a telecommunication protocol as having multiple layers, e.g., Application layer, Presentation layer, Session layer, Transport layer, Network layer, Data link layer, and Physical layer. To function correctly, each communication protocol includes a top layer protocol and one or more bottom layer protocols. Examples of top layer protocols (e.g., application layer protocols) include HTTP, HTTP2 (SPDY), and HTTP3 (QUIC), which are appropriate for transmitting and exchanging data in general formats. Application layer protocols such as RTP and RTCP may be appropriate for various real time communications such as, e.g., telephony and messaging. Additionally, SSH and SFTP may be appropriate for secure maintenance, MQTT and AMQP may be appropriate for status notification and wakeup trigger, and MPEG-DASH/HLS may be appropriate for live video streaming with user-end systems. Examples of transport layer protocols that are selected by the various application layer protocols listed above include, e.g., TCP, QUIC/SPDY, SCTP, DCCP, UDP, and RUDP.

The vehicle system 200 includes a camera 214. The camera 214 may have any resolution. In some embodiments, one or more optical components, such as a mirror, fish-eye lens, or any other type of lens may be optically coupled to the camera. In embodiments, the camera may have a broad angle feature that enables capturing digital content within a 150 degree to 180 degree arc range. Alternatively, the camera 214 may have a narrow angle feature that enables capturing digital content within a narrow arc range, e.g., 60 degree to 90 degree arc range. In embodiments, the one or more cameras may be capable of capturing high definition images in a 720 pixel resolution, a 1080 pixel resolution, and so forth. Alternatively or additionally, the camera 214 may have the functionality to capture a continuous real time video stream for a predetermined time period. It is also noted that the image capture components 100 and 104 are also cameras having some features and functionalities that are comparable to the camera 214. In embodiments, the image capture components 100, 104 may be cameras that are a part of a Closed Circuit Television (CCTV) Network. Alternatively, each of these cameras may be independent from each other and capable of transmitting images or a live video stream to various vehicles.

FIG. 3 depicts a flow chart for initiating and maintaining, by a vehicle, an image capture session with an image capture component that is external to the vehicle, according to one or more embodiments described and illustrated herein.

In embodiments, in block 310, the processor 202 of the vehicle system 200 installed within the vehicle 102 may initiate an image capture session with an image capture component 100 that is external to the vehicle 102. For example, as depicted in FIG. 4, a vehicle 102 may be parked in the parking spot 120 in a lot. In some embodiments, the vehicle owner may exit the vehicle 102 and activate a feature associated with the vehicle system 200. Thereafter, the processor 202 may, via the network interface hardware 212, send messages to the image capture components 100, 104 within a certain proximity of the vehicle 102, e.g., via the communication network 106. The communication network 106 may involve a communication protocol (e.g., TCP) that establishes a secure connection between the vehicle system 200 and the image capture components 100, 104. Various communication protocols are contemplated, e.g., UDP protocol.

Upon establishing the connection, the image capture components 100, 104 may capture one or more images and/or a live video stream of objects within their respective line of sights. For example, referring to FIGS. 1 and 4, based on the position of the image capture component 100, the vehicle 102 may be an object that appears within the line of sight 400 of the image capture component 100. Additionally, based on the position of the image capture component 104, the vehicles 108 and 110 may be other objects that appear within the line of sight of the image capture component 104. It is noted that the image capture components 100 and 104 may be cameras that are a part of a Closed Circuit Television Network (CCTV). Alternatively, each of these cameras may be independent and capable of transmitting images or live video streams to various vehicles. For example, the image capture component 100 may capture an image or a live video stream of the vehicle 102 located in the parking spot 120 at a certain point in time, and the image capture component 104 may capture an image or a live video stream of vehicles 108, 110 located in parking spots 130 and 140 at a particular point in time. In some embodiments, the image capture components 100, 104 may transmit, via the communication network 106, the captured images to the vehicle 102, 108, 110.

In block 320, the network interface hardware 212 of the vehicle system 200 may receive the image, and upon receipt, route the image via the communication path 204 to the processor 202 for processing. The processing may involve digital image analysis to extract image data of the image in order to identify contours, dimensions, and other characteristics associated with the vehicle 102. Additionally, in block 330, the processor may determine whether the image data includes identifying information associated with the vehicle, such as information related to the brand, license plate number, vehicle make and model, year of manufacture, and so forth. It is noted that identifying information associated with the vehicle includes a characteristic of the vehicle. Other such characteristics are also contemplated.

Thereafter, in block 340, the processor 202 may instruct the image capture component 100 to maintain the image capture session associated with the vehicle in response to determining that the image data includes identifying information associated with the vehicle. For example, in embodiments, the processor 202 may instruct the image capture component 100 to continue capturing images of the vehicle 102 at regular intervals, e.g., 1 minute intervals, 2 minute intervals, and 5 minute intervals, and so forth. In some embodiments, the processor 202 may instruct the image capture component 100 to capture a live video stream of the vehicle 102 for a certain time frame, e.g., 20 minutes, 30 minutes, etc. It is noted that identifying information associated with the vehicle includes a characteristic of the vehicle.

During the image capture session, images or live video streams associated with the vehicle 102 and areas within a certain proximity of the vehicle 102 may be captured. In this way, the activities associated with the vehicle and of areas within a certain proximity of the vehicle may be more effectively monitored such that instances of unauthorized individuals attempting to gain access the vehicle 102 may be identified more effectively. Additionally, in embodiments, if the processor 202 analyzes the images associated with the vehicle 102 and areas within a certain proximity of the vehicle 102, and determines (via use of a plurality of image recognition techniques described in the present disclosure) that an unauthorized individual is attempting to access the vehicle 102, the processor 202 may transmit, via the network interface hardware 212, a warning message to a mobile device of a user. Example operations of the system of the present disclosure is described in detail in FIGS. 4, 5, 6, and 7.

FIG. 4 schematically depicts an example operation of the image capture component 100 in association with the vehicle 102, according to one or more embodiments described and illustrated herein. Specifically, as described above, the vehicle 102 may initiate an image capture session with the image capture component 100, e.g., by establishing a connection via the communication network 106. As previously stated, a variety of communication protocols may be utilized to establish the connection between the vehicle 102 and the image capture component 100.

Thereafter, the vehicle 102 may receive an image or a live stream from the image capture component 100 associated with an area in and around the vehicle 102. For example, as depicted in FIG. 4, the image capture component 100 may capture one or more images of the vehicle 102, which is within a field of view 400 of the image capture component 100. For example, the field of view may include the vehicle 102 parked in the parking spot 120, and possibly one or more additional vehicles located in adjacent parking spots (not shown). The image capture component 100 may transmit, in real time, the captured images or live video stream to the processor 202 of the vehicle. Upon receipt, the processor 202 may analyze the subject matter of the received images, and based on the results of the analysis, control the operation of the image capture component 100 in various ways.

In some embodiments, the processor 202 may utilize a combination of digital image recognition and processing techniques to extract and analyze image data of the image received from the image capture component 100. For example, in some embodiments, machine learning techniques may be used to identify whole objects and/or isolated features of an object, perform classification of the identified objects or characteristics of these objects, e.g., colors, makes, models, shapes, contours and trim data of vehicles, dimensions of vehicles, etc. Image recognition and processing techniques that are not based on machine learning are also contemplated.

As depicted in FIG. 4, the processor 202 may analyze the image data of the image received from the image capture component 100 to extract certain digital characters from the image data of the received image, e.g., the license plate number of the vehicle 102. Additionally, the processor 202 may compare the extracted characters, e.g., license plate number NHX659, with vehicle data specific to the vehicle 102. The data specific to the vehicle may be stored locally in the one or more memory modules 206 of the vehicle 102. The data specific to the vehicle 102 may also include data related to the license plate number of the vehicle 102. In the example illustrated in FIG. 4, the license plate number data may be NHX659. As such, a comparison will enable the processor 202 to determine that the license plate characters identified from the extracted image data matches the license plate data stored locally in the one or more memory modules 206 of the vehicle 102. In other words, whether the image data matches vehicle data specific to the vehicle. Such a result may also be utilized by the processor 202 to confirm that the vehicle 102 is within the line of sight of the image capture component 100 at or within a certain time frame of when the image of the vehicle 102 was captured.

Based on this determination, the processor 202 may control the operation of the image capture component 100 in various ways. For example, the processor 202 may instruct the image capture component 100 to maintain the image capture session initiated by the vehicle 102 for a certain period of time, e.g., 1 minute interval, 2 minute interval, 5 minute interval, and so forth. Other time intervals are also contemplated. During the image capture session, the image capture component 100 may capture a plurality of additional images of one or more objects within the line of sight of the image capture component 100 and transmit these images to the vehicle 102 in real time. Alternatively, in some embodiments, the image capture component 100 may capture a plurality of additional images and transmit these images to the vehicle 102 at a designated time, e.g., at the end of a specific time interval such as 1 minute interval, 2 minute interval, 5 minute interval, and so forth. Other variations on such operations are also contemplated.

Additionally, in embodiments, the processor 202 may analyze the plurality of additional images received from the image capture component 100 and determine that unauthorized activity associated with the vehicle 102 may be occurring during the image capture session. For example, the processor 202 may analyze image data of the additional images and determine that an individual may be attempting to gain access to the vehicle 102 without authorization. Upon such a determination, the processor 202 may transmit a warning to a mobile device of a user (e.g., the owner of the vehicle 102) in real time, thereby enabling the vehicle owner to take actions to prevent theft of the vehicle. Alternatively, the vehicle 102 may, automatically and without user intervention, output a warning in the form of an alarm.

FIG. 5 schematically depicts an example operation of the image capture component 100 relative to the vehicle 102 based on a movement of the vehicle 102 outside the field of view 400 of the image capture component 100, according to one or more embodiments described and illustrated herein. For example, as illustrated in FIG. 5, the vehicle 102 may move outside of the field of view 400 of the image capture component 100 e.g., when an or operator drives the vehicle 102 towards the exit along route 502 from the parking spot 120. The processor 202 may be configured to detect the location of the vehicle 102 at various times during the image capture session. For example, the processor 202 may detect the vehicle 102 at a first location (e.g. at the parking spot 120) at a particular time during the image capture session and at a second location (e.g., near the exit sign in a parking lot) at a different time within the image capture session.

Within a certain time frame after this movement, the image capture component 100 may capture one or more additional images within the field of view 400, namely of the parking spot 120, and transmit these images to the vehicle 102. The processor 202 of the vehicle 102 may analyze the image data associated with these images, compare one or more characteristics identified within the image data (e.g., vehicle identifying information) with data specific to the vehicle 102 (e.g., license plate number) that is stored in the one or more memory modules 206, and determine that the image data does not include any characters that match the data specific to the vehicle 102. In other words, based on the comparison, the processor 202 may determine that the vehicle 102 is no longer within the field of view 400 of the image capture component 100.

Based on this determination, the processor 202 may terminate the image capture session initiated by the vehicle 102 with the image capture component 100. In some embodiments, immediately upon detecting a change in the location of the vehicle 102, the processor 202 may, automatically and without user intervention, request one or more additional images from the image capture component 100 and analyze the image data within the received images. In other embodiments, the processor 202 may detect a change in the orientation and/or location of the vehicle 102 relative to the image capture component 100, compare the orientation and location with one or more threshold values, determine that the vehicle 102 has moved outside of the field of view 400 of the image capture component 100, and terminate, automatically and without user intervention, the image capture session.

FIG. 6 depicts a flow chart for initiating and terminating an image capture session with an image capture component that is external to the vehicle, according to one or more embodiments described and illustrated herein. FIG. 7 depicts an example operation for initiating and terminating, by the vehicle, an additional image capture session with an additional image capture component that is external to the vehicle, according to one or more embodiments described and illustrated herein. It is noted that a discussion of FIG. 6 will be interspersed with a discussion of FIG. 7.

In embodiments, in block 610, the processor 202 of the vehicle system 200 may initiate an image capture session with an additional image capture component (e.g., image capture component 104). Specifically, as depicted in FIG. 7, the vehicle 102 parked in the parking spot 120 may, via the network interface hardware 212, send messages to the image capture component 104, which may be mounted on a side wall of the parking lot at a location that is adjacent to the vehicle 102. As previously stated, the network interface hardware 212 may send messages to one or more image capture components 100, 104 within a certain proximity of the vehicle 102, e.g., using the communication network 106. The communication network 106 may involve a communication protocol (e.g., TCP) that establishes a secure connection between the vehicle system 200 and the image capture components 100, 104. Various communication protocols are contemplated, e.g., UDP protocol.

Upon establishing the connection, the image capture component 104 may capture one or more images and/or a live video stream of one or more objects within the line of sight of the image capture component 104. For example, referring to FIGS. 1 and 7, based on the position of the image capture component 104, the vehicles 108 and 110 may be objects that appear within the line of sight 700 of the image capture component 104. The image capture component 104 may then transmit the images of the one or more objects (e.g., images of vehicles 108 and 110) to the vehicle system 200 of the vehicle 102. These images may be transmitted to the respective processors of the vehicles 108, 110.

In embodiments, in block 620, the network interface hardware 212 of the vehicle system 200 within the vehicle 102 may receive the one or more images, and upon receipt, route these images via the communication path 204 to the processor 202.

In embodiments, in block 630, the processing may involve analyzing image data of the images received from the image capture component 104 to extract certain digital characters, e.g., the license plate numbers HJC856 and KAH988 of the vehicles 108 and 110. Additionally, the processor 202 may compare the extracted characters with data specific to the vehicle 102. As illustrated in FIG. 7, the processor 202 may compare the license plate numbers extracted from image data associated with vehicles 108 and 110 with the license plate number NHX659 stored locally in the one or more memory modules 206 of the vehicle 102. Based on the comparison, the processor 202 may determine that the license plate numbers do not match.

In embodiments, in block 640, the processor 202 may instruct, based on the analysis, the image capture component 104 to terminate the additional image capture session with the vehicle 102. In contrast, the processors of the vehicles 108, 110 may instruct the image capture component 104 to maintain the image capture session associated with the vehicles 108, 110 in response to determining that the image data includes identifying information associated with the vehicle 108, 110.

It should now be understood that the embodiments described herein a method for initiating, maintaining, and terminating an image capture session with an external image capture component. The method includes initiating an image capture session with an image capture component that is external to the vehicle, receiving, from the image capture component, an image, determining whether image data of the image includes identifying information associated with the vehicle, and instructing the image capture component to maintain the image capture session associated with the vehicle in response to determining that the image data includes identifying information associated with the vehicle. Additionally, the method include terminating the image capture session with the image capture component in response to determining that the image data does not include the identifying information.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a processor configured to:
  initiate an image capture session with an image capture component that is external to the vehicle;
  receive, from the image capture component, an image;
  determine whether image data of the image includes identifying information associated with the vehicle;
  instruct the image capture component to maintain the image capture session associated with the vehicle in response to determining that the image data includes the identifying information, and
  terminate the image capture session with the image capture component in response to determining that the image data does not include the identifying information associated with the vehicle.

2. The vehicle of claim 1, wherein the identifying information associated with the vehicle includes a characteristic of the vehicle.

3. The vehicle of claim 2, wherein the characteristic of the vehicle is data specific to the vehicle stored locally in memory of the vehicle.

4. The vehicle of claim 2, wherein the characteristic of the vehicle includes at least one of a license plate number of the vehicle, trim information, make information of the vehicle, or model information of the vehicle.

5. The vehicle of claim 1, wherein the image capture session is associated with a time period.

6. The vehicle of claim 1, wherein the processor is further configured to:
  detect a location of the vehicle when the processor initiates the image capture session with the image capture component, and
  determine whether the vehicle moves to an additional location.

7. The vehicle of claim 6, wherein the processor is further configured to instruct the image capture component to terminate the image capture session in response to determining that the vehicle moves to the additional location.

8. The vehicle of claim 1, wherein the processor is further configured to:
  initiate an additional image capture session with an additional image capture component that is external to the vehicle;
  receive, from the additional image capture component, an additional image;
  determine whether additional image data of the additional image includes the identifying information associated with the vehicle; and
  instruct the additional image capture component to maintain the additional image capture session associated with the vehicle in response to determining that the additional image data includes the identifying information.

9. A method implemented by a processor of a vehicle, the method comprising:
  initiating an image capture session with an image capture component that is external to the vehicle;
  receiving, from the image capture component, an image;
  determining whether image data of the image includes identifying information associated with the vehicle;
  instructing the image capture component to maintain the image capture session associated with the vehicle in response to determining that the image data includes the identifying information; and
  terminating the image capture session with the image capture component in response to determining that the image data does not include the identifying information.

10. The method of claim 9, wherein the identifying information associated with the vehicle includes a characteristic of the vehicle.

11. The method of claim 10, wherein the characteristic of the vehicle is data specific to the vehicle stored locally in memory of the vehicle.

12. The method of claim 10, wherein the characteristic of the vehicle includes at least one of a license plate number of the vehicle, trim information, make information of the vehicle, or model information of the vehicle.

13. The method of claim 9, wherein the image capture session is associated with a time period.

14. The method of claim 9, further comprising:
 detecting a location of the vehicle when the processor initiates the image capture session with the image capture component; and
 determining whether the vehicle moves to an additional location.

15. The method of claim 14, further comprising instructing the image capture component to terminate the image capture session in response to determining that the vehicle moves to the additional location.

16. The method of claim 9, further comprising:
 initiating an additional image capture session with an additional image capture component that is external to the vehicle;
 receiving, from the additional image capture component, an additional image of an additional area that is external to the vehicle;
 analyzing the additional image associated with the additional area; and
 instructing, based on the analyzing, the additional image capture component to terminate the image capture session with the vehicle.

17. A vehicle comprising:
 a processor configured to:
  initiate an image capture session with an image capture component that is external to the vehicle;
  receive, from the image capture component, an image;
  analyze the image; and
  instruct, based on the analyzing of the image, the image capture component to
  terminate the image capture session with the vehicle in response to determining that the image does not include identifying information associated with the vehicle.

18. The vehicle of claim 17, wherein the processor is further configured to:
 extract image data from the image;
 determine whether the image data matches vehicle data specific to the vehicle stored locally in memory of the vehicle; and
 instruct the image capture component to terminate the image capture session with the vehicle in response to determining that the image data does not match the vehicle data specific to the vehicle.

* * * * *

UNITED STATES PATENT AND TRADEMARK OFFICE
CERTIFICATE OF CORRECTION

PATENT NO. : 11,807,188 B2
APPLICATION NO. : 17/148792
DATED : November 7, 2023
INVENTOR(S) : Masashi Nakagawa It is certified that error appears in the above-identified patent and that said Letters Patent is hereby corrected as shown below:

In the Specification

In Column 2, Line(s) 9, after "one", insert --or more--.

In Column 3, Line(s) 18, after "one", insert --or more--.

In Column 8, Line(s) 8, delete "is" and insert --are--, therefor.

In Column 11, Line(s) 15, after "herein", insert --,--.

In Column 11, Line(s) 26, delete "include" and insert --includes--, therefor.

In the Claims

In Column 12, Line(s) 9, Claim 1, after "information", delete "," and insert --;--, therefor.

Signed and Sealed this
Twenty-sixth Day of December, 2023

Katherine Kelly Vidal
*Director of the United States Patent and Trademark Office*